United States Patent [19]
Yang et al.

[11] Patent Number: 5,828,708
[45] Date of Patent: Oct. 27, 1998

[54] CID DEMODULATOR FOR DCT

[75] Inventors: Ganning Yang, Irvine; Stephen C. Muller, San Diego; Virginia M. Chan, Fountain Valley, all of Calif.

[73] Assignee: Rockwell International Corporation, Newport Beach, Calif.

[21] Appl. No.: 569,489

[22] Filed: Dec. 7, 1995

[51] Int. Cl.[6] ............................ H03D 3/00; H04L 27/22
[52] U.S. Cl. ............................ 375/334; 329/105
[58] Field of Search .................... 329/105, 300; 375/350, 334; 379/61, 58, 142

[56] References Cited

U.S. PATENT DOCUMENTS

| | | | |
|---|---|---|---|
| 4,568,882 | 2/1986 | Single | 329/105 |
| 4,922,490 | 5/1990 | Blakley | 370/110.1 |
| 5,155,446 | 10/1992 | Eberle et al. | 329/300 |
| 5,434,905 | 7/1995 | Maeda et al. | 379/61 |
| 5,513,223 | 4/1996 | Shoji | 375/350 |
| 5,524,028 | 6/1996 | Terada et al. | 375/350 |

*Primary Examiner*—Stephen Chin
*Assistant Examiner*—Mohammad Ghayoar
*Attorney, Agent, or Firm*—James P. O'Shaughnessy; William C. Cray

[57] ABSTRACT

A system for demodulating a FSK digital signal comprising: first and second frequency detectors connected to detect the frequency of the digital signal, the first frequency detector producing an output signal whenever the digital signal is detected to have a first frequency and the second frequency detector producing an output signal whenever the digital signal is detected to have a second frequency; first and second low pass filters each having an input connected to receive the output signal produced by a respective frequency detector and an output for providing a smoothed version of the signal at the respective filter input; and signal combining circuitry connected to the outputs of the first and second filters for providing a demodulated output signal representing the FSK digital signal.

10 Claims, 2 Drawing Sheets

CID DEMODULATOR FOR DCT

BACKGROUND OF THE INVENTION

The present invention relates to a CID demodulator for use in or with a telephone instrument.

One service being offered by telephone companies is known as caller identification (CID). When a call is initiated from any telephone in the telephone company system, equipment in the system generates a CID signal identifying the calling instrument. This signal is sent to the called instrument during the interval between the first and second ring tones.

Typically, the CID signal is produced by generating binary data representing the calling telephone number and performing frequency shift keying (FSK) modulation of the binary data, wherein one binary value is modulated at a first frequency and the other binary value is modulated at a second frequency. For example, current standards specify a CID signal data rate, or bit rate, of 1.2 kbits/sec, a first modulation frequency of 1.2 kHz for modulating a bit having a "1" value, and a second modulation frequency of 2.2 kHz for modulating a bit having a "0" value.

In FIG. 1, curve a represents binary data forming part of a CID data word and curve b represents the corresponding part of a FSK modulated CID signal.

When CID was introduced, use of the service required installation, at the subscriber location, of special equipment for decoding the CID signal and displaying the decoded CID information. While this continues to be the practice, it would be desirable to build a CID capability into telephone instruments.

In the case of telephone instruments utilizing digital technology, such as digital cordless telephones (DCTs), attempts to incorporate a CID capability into the instrument have not produced acceptable results.

In a DCT, incoming voice and data signals arrive at a codec which samples the arriving signals at a sampling rate of 8 kHz. For each sample, the codec produces a signal composed of a succession of digital words, each composed of a string of bits, representing the amplitude of a respective sample of the arriving signal.

The sampling rate (8 kHz) of the codec corresponds to 6⅔ samples for each CID signal bit.

Proposals have been made to provide a noncoherent demodulator in a DCT for permitting CID detection. Such a demodulator includes two detectors each connected to receive the digital signal from the codec. Each detector determines the frequency of the CID signal during each CID signal data bit period and produces a binary output. One detector produces a binary "1" when the data bit of the arriving CID signal is a binary "1" and the other detector produces a binary "1" when the data bit of the arriving CID signal is a binary "0". The detector output signals are then processed and decoded to produce a CID indication. Each detector can be a standard noncoherent detector for which design information can be found in communications texts.

Such a demodulator has not proven satisfactory notably because of fluctuations present in the detector output signals due to the fact that the codec sampling rate is not an integral multiple of the CID data bit rate. Exemplary detector output signals are shown at c and d in FIG. 1.

In addition, synchronous algorithms based on pattern correlation do not produce acceptable results since the short duration of each CID data bit limits reliable timing operation, particularly in the case of asynchronous mode operation.

The possibility of solving these problems is complicated by the limited computation power of the microcontroller of modern DCTS.

SUMMARY OF THE INVENTION

It is an object of the present invention to improve CID performance in a digital telephone instrument.

A specific object of the invention is to eliminate the deleterious effects of fluctuations in the output signals of CID demodulator detectors.

A further specific object of the invention is to eliminate the shortcomings of existing demodulator algorithms.

The above and other objects are achieved, according to the invention, by a system for demodulating a FSK digital signal comprising: first and second frequency detectors connected to detect the frequency of the digital signal, the first frequency detector producing an output signal whenever the digital signal is detected to have a first frequency and the second frequency detector producing an output signal whenever the digital signal is detected to have a second frequency; first and second low pass filters each having an input connected to receive the output signal produced by a respective frequency detector and an output for providing a smoothed version of the signal at the respective filter input; and signal combining means connected to the outputs of the first and second filters for providing a demodulated output signal representing the FSK digital signal.

DESCRIPTION OF THE PREFERRED EMBODIMENTS

Figure 1:
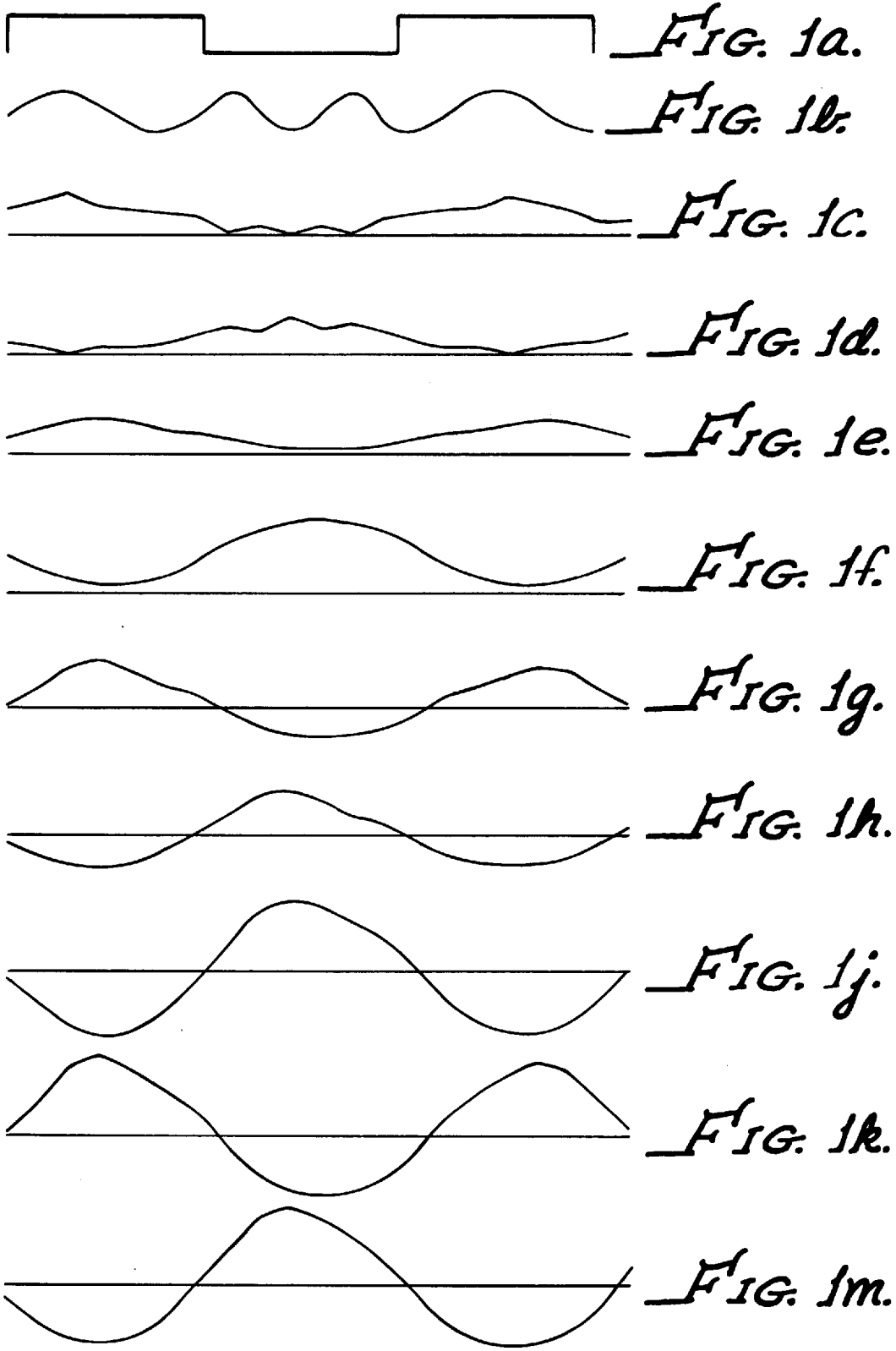
FIG. 1 is a waveform diagram illustrating various signals associated with CID reception and decoding.
Figure 2:
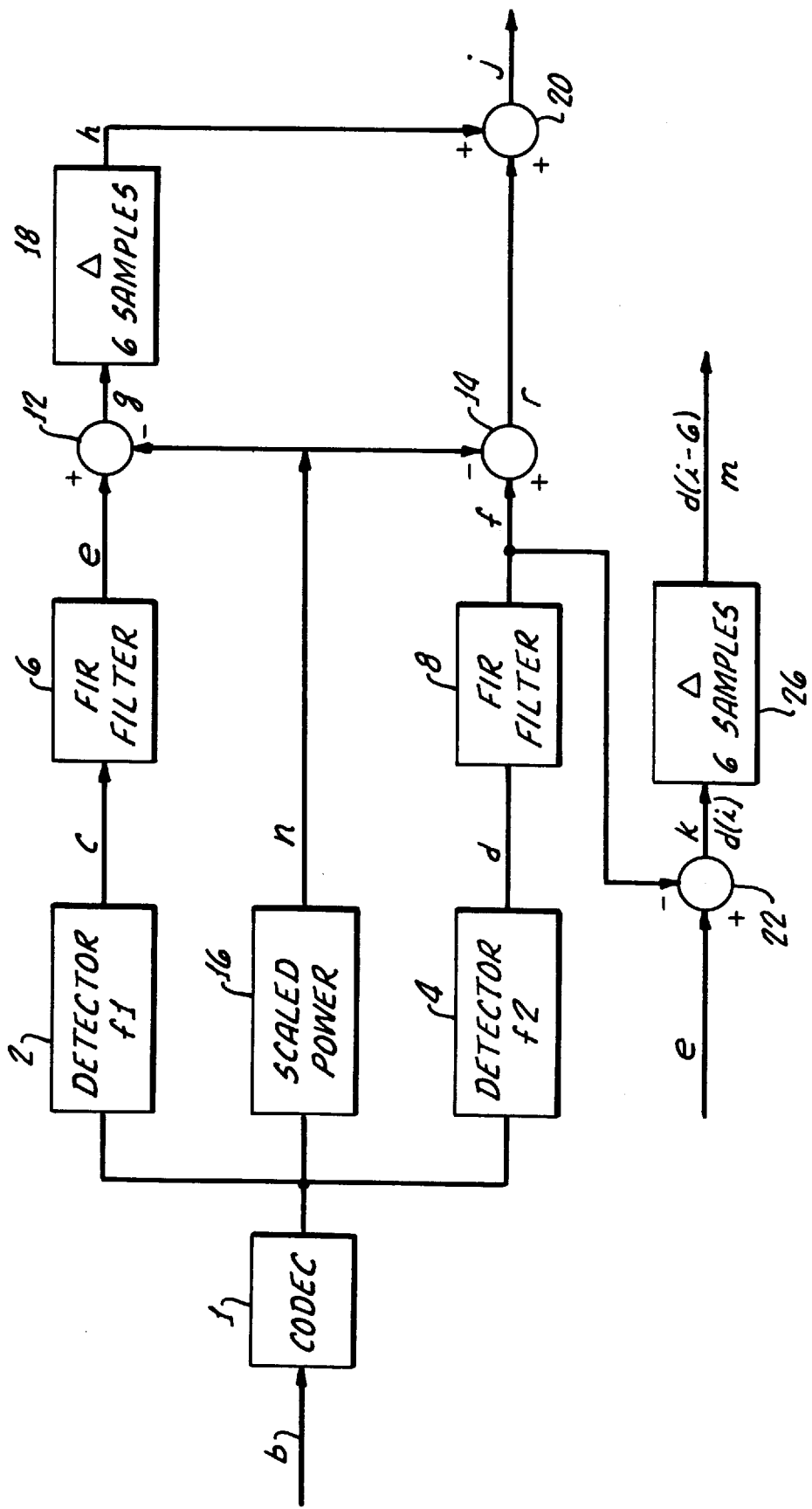
FIG. 2 is a block diagram of one preferred embodiment of a system according to the invention.

One embodiment of a system for decoding CID signals according to the invention is shown in FIG. 2. This system includes a conventional codec 1 connected to receive the incoming signal (FIG. 1, curve b) and to sample this signal at an assigned sampling rate, for example 8 kHz. The samples are delivered to a first detector 2 which processes the samples in order to detect the presence of the first modulation frequency f1 (e.g. 1.2 kHz) and a second detector 4 for measuring the samples in order to detect the presence of the second modulation frequency f2 (e.g. 2.2 kHz). When detector 2 detects a frequency of f1, it outputs a signal having a high value, as shown by curve c in FIG. 1. On the other hand, when detector 4 detects a signal having the frequency f2, it outputs a high value, as shown by curve d in FIG. 1.

According to the invention, the output signals from detectors 2 and 4 (FIG. 1, curves c and d) are delivered to respective matched finite impulse response (FIR) filters 6 and 8. As shown by curves e and f in FIG. 1, filters 6 and 8 can be constructed to effect substantial smoothing of the output signals c and d of detectors 2 and 4. According to one embodiment of the invention, each filter 6, 8 is a FIR having three taps with filter coefficients of {1, 2, 1}. Each filter 6, 8 produces a time delay equal to one sample period.

The outputs of filters 6 and 8 are delivered to adding inputs of respective difference elements 12 and 14. Each element 12 and 14 has a subtracting input which is connected to receive a signal from a scaled power circuit 16. Circuit 16 is constructed in a conventional manner to perform a calculation of received signal power. Based on this calculation, circuit 16 produces a fixed scale factor. The purpose of this circuit is to ensure that the correlation threshold at the output of adder 20 (to be described below), is independent of variations in the level of the received signal. For example, the correlation threshold can be given a value of zero for any input signal level and the scale factor can be selected based on the gains of the detectors 2 and 4 and filters 6 and 8 to provide an optimum decision point.

The output from difference element 12 is delayed in a first delay line 18 by a period corresponding to six samples, or approximately one CID signal bit period, and the outputs of delay line 18 and difference element 14 are supplied to adding inputs of an adder 20. The sum signal formed at the output of adder 20 constitutes a correlation of the outputs of filters 6 and 8, i.e. of a {1, 0} transient pattern, which is used as a bit timing decision variable.

The detector outputs e and f are also supplied to a difference element 22 in such a manner that the output of difference element 22 d(i), signal k of FIG. 1, represents the difference between the detector output signals. This difference is supplied to a second delay line 26 which delays the signal from difference element 22 by a period equal to six sample periods, or approximately one CID signal bit period, thus producing a delayed output d(i−6) signal on a FIG. 1.

The output of the second delay line 26, along with the output of summing circuit 22 and the output of adder 20, can serve as a basis for optimizing the sampling timing.

The present invention uses a timing algorithm which is based on both pattern correlation and demodulation information.

Assuming that the current demodulation sample from codec 1 is d(i) and the sixth demodulation sample preceding d(i) is d(i−6), the design criterion that is employed can be:

d(i)<0 and d(i−6)>0 and max {smaller of d(i), d(i−6)} for a succession of values of i extending over a selected range.

The complete algorithm can be described as follows:

1. If {correlation(i)=j(i)>threshold and d(i)<0 and d(i−6)>0} then start to search for an initial timing position in next 6 samples.

2. For the next 6 samples, if {correlation(i)>threshold and d(i)<0 and d(i−6)>0 then find the initial timing position from the 6 samples such that a*correlation(i)+(1−a)*min{d(i), d(i−6)} is maximum, where a is a weighting factor, and $0 \leq a \leq 0.5$.

Parameter a can be finely tuned based on experiment. The above algorithm is only for initial synchronization of one byte reception. Based on an initial timing position i(0), the rest of the bit timing position can be adapted based on simple operation described as follows:

If initial timing position is i(0) for the 0th bit, the nth bit timing can be determined i(n)=floor{i(0)+n*6.67+0.5} for 0<n<9 where the function floor(x) returns the greatest integral value less than or equal to x.

Simulation shows that this scheme can work in both synchronous and asynchronous transmission modes. It shows that BER performance of $10^{-4}$ can be achieved at SNR of around 13 dB. This performance is close to the theoretical bounds for noncoherent FSK demodulation.

Reverting to the circuit shown in FIG. 2, which implements the above-described algorithm, the digital values produced at various identified points will be the following:

Element 12: g(i)=e(i)−n(i) i=ith sample
Element 14: r(i)=f(i)−n(i)
Element 18: h(i)=g(i−6)
Element 20: j(i)=h(i)+r(i)
Element 22: k(i)=e(i)−f(i)=d(i)
Element 26: m(i)=k(i−6)=d(i−6)

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A system for demodulating a FSK digital signal, and for establishing the bit timing of a plurality of data bits in the digital FSK signal that are transmitted at a digital signal bit rate, the system comprising:

means for sampling the FSK digital signal and for outputting signal samples of the FSK digital signal, the sampling means having a sampling rate that is higher than the digital signal bit rate and which provides a non-integer number of samples per data bit which makes the bit timing of the data bits vary in time and with uncertainty relative to the sampling rate;

first and second frequency detectors that receive the signal samples and detect the frequency of the FSK digital signal, said first frequency detector producing an output signal whenever the FSK digital signal is detected to have a first frequency and said second frequency detector producing an output signal whenever the FSK digital signal is detected to have a second frequency;

first and second low pass filters each having an input connected to receive the output signal produced by a respective frequency detector and an output for providing a smoothed version of the output signal;

a first delay line means for delaying the output signal of said first filter by a whole number "n" of sample periods and for outputting a delayed signal;

signal combining means for combining the delayed signal from said first delay line means with the output of said second filter for providing a correlation threshold signal;

signal combining means connected to the outputs of said first and second filters for providing a difference signal d(i)

second delay means for receiving the difference signal d(i) and providing a delayed difference signal d(i−n);

means for establishing an initial bit time of an initial data bit of the FSK digital signal based on the correlation signal, the difference signal d(i), and the delayed difference signal d(i−n); and means for establishing successive bit times of a limited number of successive data bits of the digital FSK signal based on the initial bit time.

2. A system according to claim 1 wherein each of said filters is a tapped delay line filter.

3. A system according to claim 1 wherein each of said filters is a finite impulse response filter.

4. A system according to claim 3 wherein each said finite impulse response filter has three taps.

5. A system according to claim 4 wherein the three taps of each said finite impulse response filter have associated filter coefficients of {1, 2, 1}.

6. A system according to claim 1 in a digital cordless telephone base station and wherein said sampling means comprises a codec in said base station for sampling the FSK digital signal at a sampling rate, said codec having an output connected to said first and second frequency detectors for supplying samples of the FSK digital signal to said first and second frequency detectors.

7. A system according to claim 6 wherein the FSK digital signal contains CID data bits.

8. A system according to claim 1 in a digital cordless telephone base station.

9. The system of claim 1 wherein the initial bit time establishing means operates on a succession "n" of signal samples and, for each signal sample, comprises:

means for determining that the correlation threshold signal is greater than a designated level; and means for determining that the difference signal d(i) is less than zero {d(i)<0} and that the delayed difference signal d(i−n) is greater than zero.

10. The system of claim 1 wherein the means for finding subsequent timing positions based on the initial timing position applies the following formula where i(0) is the initial timing position and i(n) is a subsequent timing position:

i(n)=FLOOR{i(0)+n*6.67+0.5} where the FLOOR (X) equals to greatest integral value less than or equal to X.

* * * * *